United States Patent [19]

Gemma et al.

[11] Patent Number: 5,144,473
[45] Date of Patent: * Sep. 1, 1992

[54] ORGANIC THIN FILM DISPLAY ELEMENT

[75] Inventors: Nobuhiro Gemma, Yokohama; Toshio Nakayama, Fujisawa; Syun Egusa, Yokohama; Akira Miura, Toride; Makoto Azuma, Yokohama; Shinya Aoki, Kawasaki; Katsuyuki Naito, Yokohama, all of Japan

[73] Assignee: Kabushiki Kaisha Toshiba, Kawasaki, Japan

[*] Notice: The portion of the term of this patent subsequent to Oct. 3, 2006 has been disclaimed.

[21] Appl. No.: 500,925

[22] Filed: Mar. 29, 1990

[30] Foreign Application Priority Data

Mar. 31, 1989 [JP] Japan .................. 1-83515
Sep. 29, 1989 [JP] Japan ................. 1-254895
Sep. 29, 1989 [JP] Japan ................. 1-254943

[51] Int. Cl.$^5$ .......................... G02F 1/01; G02F 1/07; G02F 1/03
[52] U.S. Cl. ..................... 359/270; 359/272; 359/268
[58] Field of Search ............... 350/353, 355, 356, 357; 359/270, 272, 268

[56] References Cited

U.S. PATENT DOCUMENTS

| | | | |
|---|---|---|---|
| 3,521,941 | 8/1970 | Deb et al. | 350/357 |
| 4,194,812 | 3/1980 | Hara et al. | 350/357 |
| 4,449,790 | 5/1984 | Thöni | 350/357 |
| 4,655,554 | 4/1987 | Armitage | 350/356 |
| 4,768,865 | 9/1988 | Greenberg et al. | 350/357 |
| 4,803,011 | 2/1989 | Barraud et al. | 252/500 |
| 4,819,210 | 4/1989 | Miura et al. | 365/106 |
| 4,871,236 | 10/1989 | Gemma et al. | 350/355 |

FOREIGN PATENT DOCUMENTS

| | | | |
|---|---|---|---|
| 0019976 | 12/1980 | European Pat. Off. | 350/357 |
| 0215683 | 3/1987 | European Pat. Off. | |
| 0301551 | 2/1989 | European Pat. Off. | |
| 52-007756 | 1/1977 | Japan | 350/357 |
| 60-175035 | 9/1985 | Japan | 350/357 |
| 61-239227 | 10/1986 | Japan | 350/357 |
| 63-161433 | 7/1988 | Japan | |

OTHER PUBLICATIONS

Physica B+C, Europhysics Journal, vol. 143 B+C, Nos. 1-3, Nov. 1986 (North-Holland Amsterdam) "Physics and Chemistry of Quasi One-Dimensional Conductors".

Physical Review B, vol. 39, No. 14, pp. 10441-10444, "Intrinsic Negative-Resistance Effect in Mixed-Stack Charge-Transfer Crystals"; Y. Iwasa, T. Koda, S. Koshihara, Y. Tokura, N. Iwasawa and G. Saito; Apr. 15, 1989.

Applied Physics Letters, vol. 51, No. 12, pp. 913-915, "Organic Electroluminescent Diodes"; C. W. Tang and S. A. VanSlyke; Sep. 21, 1987.

Applied Physics Letters, vol. 34, No. 6, pp. 405-407; "Electrical Switching and Memory Phenomena in Cu-TCNQ thin films"; P. S. Potember et al; Mar. 15, 1979.

Primary Examiner—Rolf Hille
Assistant Examiner—Mahshid Saadat
Attorney, Agent, or Firm—Oblon, Spivak, McClelland, Maier & Neustadt

[57] ABSTRACT

An organic thin film display element comprises a pair of electrodes, an organic thin film interposed between the electrodes and including both donor molecules and acceptor molecules, and an insulating layer having a relative dielectric constant of 10 or more, and interposed between at least one of the electrodes and the organic thin film.

12 Claims, 4 Drawing Sheets

ORGANIC THIN FILM DISPLAY ELEMENT

BACKGROUND OF THE INVENTION

1. Field of the Invention

This invention relates to an organic thin film display element.

2. Description of the Related Art

Recently, in accordance with the development of techniques of forming organic-molecule very thin films represented by the Langmuir-Blodgett's technique ("LB technique" hereinafter), techniques for applying organic thin films to various elements have been remarkably developed. For example, the studies of MIS (metal-insulator semiconductor) elements using organic thin films, made by G. G. Roberts et al. in the Duhram University, are famous. However, elements having novel functions and effectively utilizing the properties of organic thin films have not been realized.

From the viewpoint of the application of organic thin films to elements, much attention has been paid to a charge-transfer phenomenon occurring between organic molecules. Organic materials include donor molecules having a low ionization potential and a tendency to give an electron to other molecules to become positive ions, and acceptor molecules having a high electron affinity and a tendency to receive an electron from other molecules to become negative ions. It is well known that a compound called a charge-transfer complex is formed between these two types of molecules. For instance, a compound of perylene and tetracyanoquinodimethane (TCNQ) consists of neutra molecules. On the other hand, a compound of tetramethylphenylenediamine (TMPD) and TCNQ is an ionic compound consisting of positive and negative ions. It is also known that a neutral-ionic transition phenomenon due to a change in temperature or pressure is observed in a compound of tetrathiafulvalene (TTF) and chloranil (CA) (J. B. Torrance et al Phys. Rev. Lett., 46,253 (1981).

When the charge-transfer phenomenon in organic molecules is applied to as the operational principle of a display element, it is necessary to realize that the charge-transfer is caused by an electric field or light with high efficiency and high controllability. Data of interest, relating to electrical characteristics of a charge-transfer complex, has recently been reported (Y. Tokura et al.; Manuscripts for Meeting of the Physical Society, 3a-S4-1, 3a-S4-2, 3a-S4-3, etc. (Autumn 1988); Y. Tokura et al.; Physica 143B, 527 (1986)). Namely, it is reported that in a mixed stacked compound crystal in which donor molecules and acceptor molecules are stacked with their molecular planes facing each other, the anisotropy of relative dielectric constant is high, the relative dielectric constant in the direction of stacking is very high, i.e. 100 to 1000, and non-linear electric conductivity or switching characteristics are observed under an electric field on the order of $10^3$ to $10^4$ V/cm. The reason for this is considered to be that an ionic domain formed in a neutral crystal or a neutral domain formed in an ionic crystal, thermally or electrically, is dynamically moved by an electric field.

This phenomenon, though relating to neutral-ionic transition, occurs in a very local area, and no macroscopic change appears in the whole crystal. Macroscopic neutral-ionic transition due to an electric field or light has not been realized as yet. However, in practical display elements, it is necessary that the whole crystal be changed macroscopically in accordance with the neutral-ionic transition.

In order to cause the macroscopic neutral-ionic transition in a charge-transfer complex under an electric field, it is essential to apply to the complex an electric field strength higher than the aforementioned value. Tokura et al. evaluated the aforementioned characteristics with use of a bulk crystal having a size of several millimeters in each side. In the bulk crystal, however, an electric current through the complex increases greatly in accordance with the increase in electric field strength. Thus, an electric field strength applied to the complex is limited. In order to strengthen an electric field applied to the charge-transfer complex, it is necessary to employ an element structure in which an electric current does not increase even if a high electric field is applied.

SUMMARY OF THE INVENTION

The object of the present invention is to provide a practical organic thin film display element, wherein a high electric field can be effectively applied to a charge-transfer complex formed in an organic thin film.

An organic thin film display element according to the present invention comprises a pair of electrodes, an organic thin film interposed between the electrodes and including both donor molecules and acceptor molecules, and an insulating layer having a relative dielectric constant of 10 or more and interposed between at least one of the electrodes and the organic thin film.

In the organic thin film display element of the present invention, a high electric field can be effectively applied to a charge-transfer complex formed in an organic thin film, and macroscopic neutral-ionic transition can be caused to occur. Thus, this display element can be put into practice.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
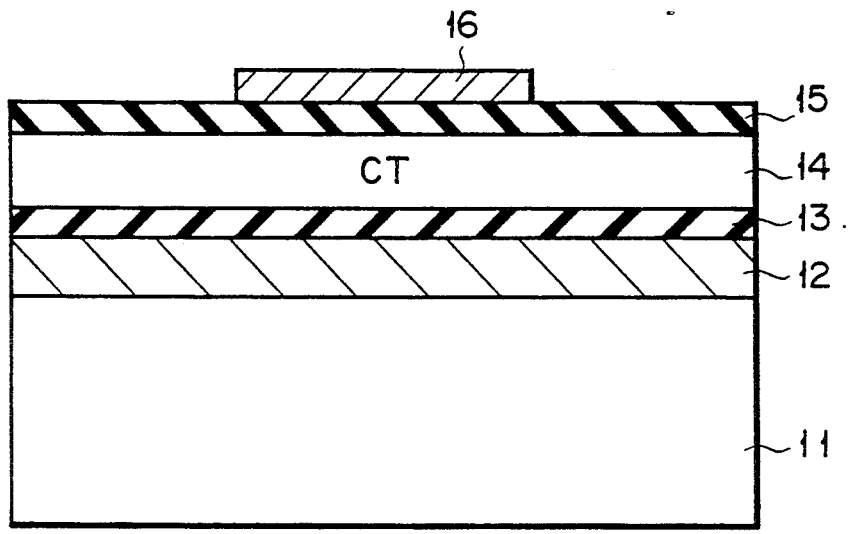
FIG. 1 is a cross-sectional view showing an example of an organic thin film display element according to the present invention.

Examples of donor molecules suitable for the present invention will be shown:

(1) Fulvalene type donor having the undermentioned structural formulas:

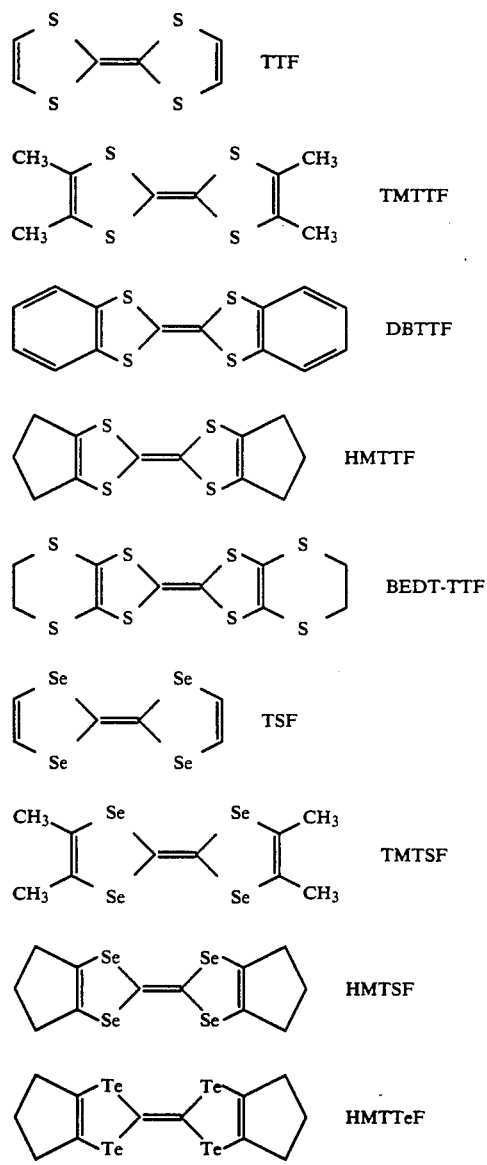

(2) S-containing heterocyclic donor having the undermentioned structural formulas:

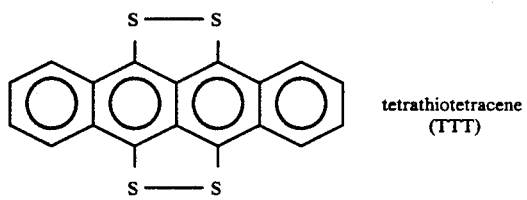

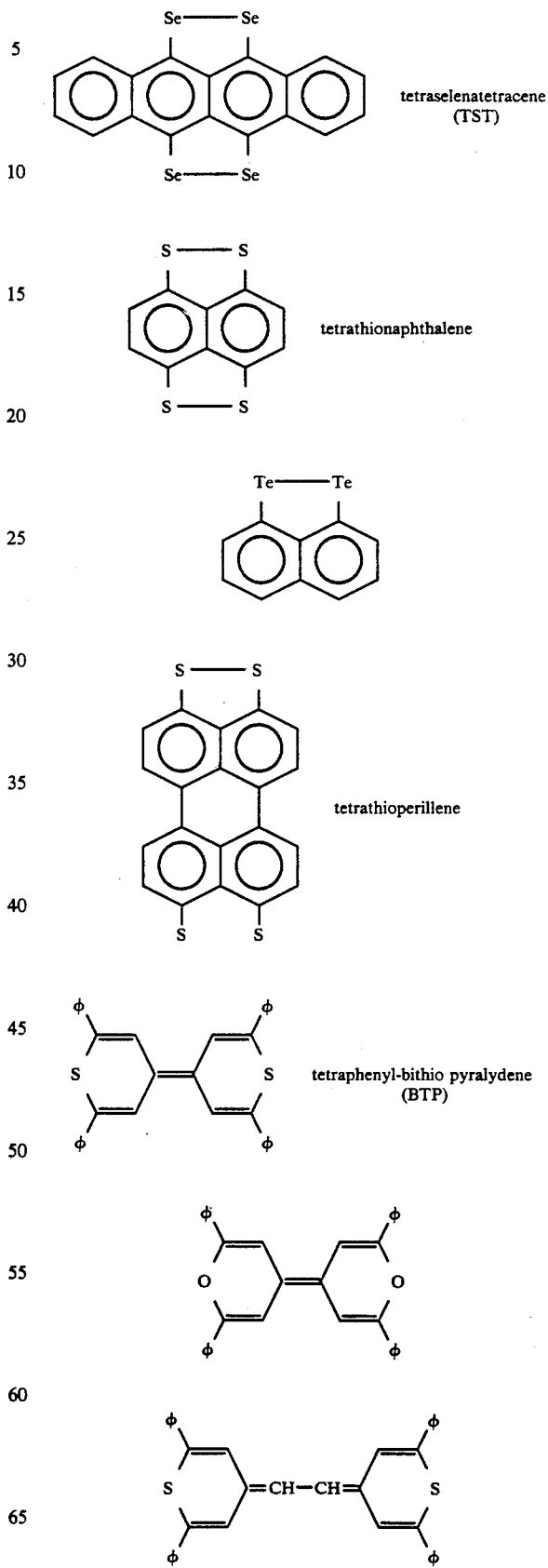

-continued

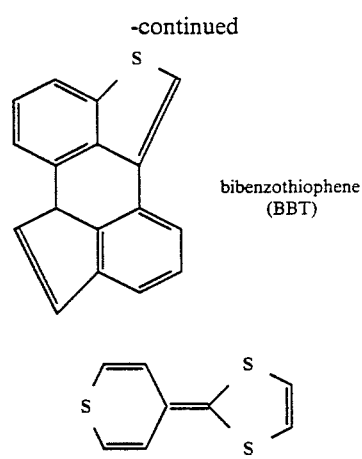

bibenzothiophene (BBT)

Note:
φ given in the above formulas represents a phenyl group.

(3) Amine type donor having the undermentioned structural formulas:

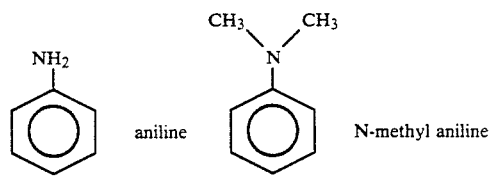

aniline     N-methyl aniline

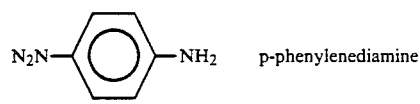

p-phenylenediamine

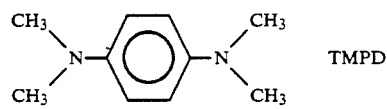

TMPD

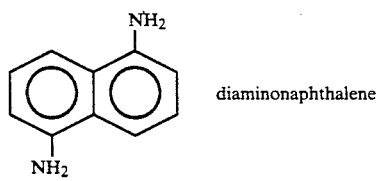

diaminonaphthalene

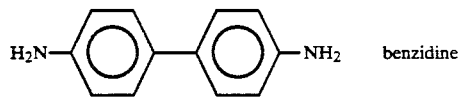

benzidine

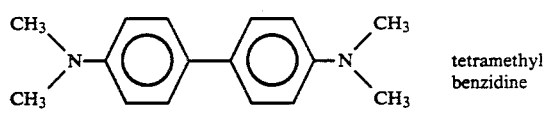

tetramethyl benzidine

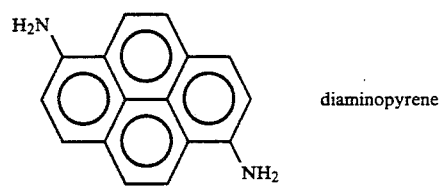

diaminopyrene

-continued

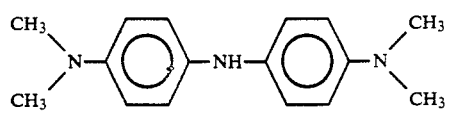

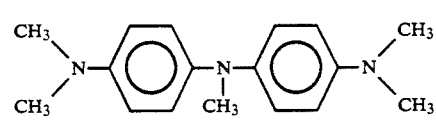

(4) Metal compound type donor having the undermentioned structural formulas:

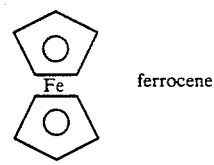

ferrocene

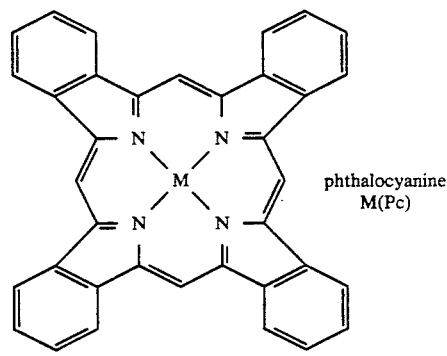

phthalocyanine M(Pc)

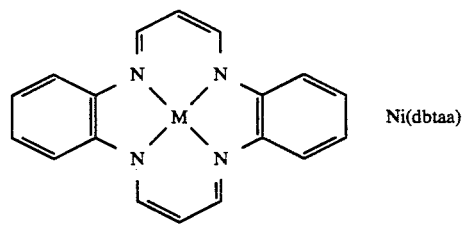

Ni(dbtaa)

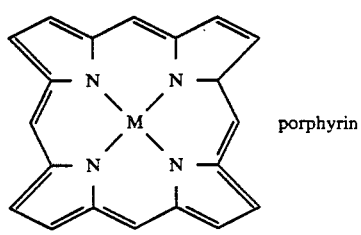

porphyrin

-continued
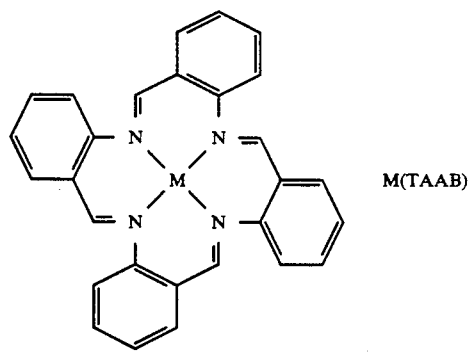 M(TAAB)
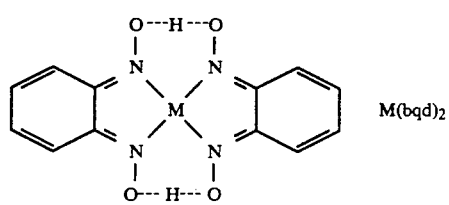 M(bqd)$_2$
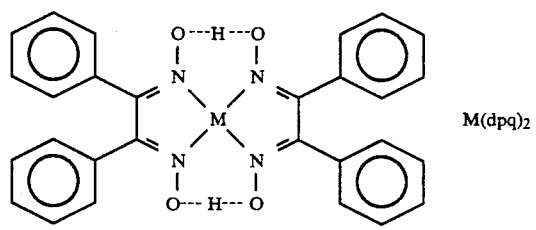 M(dpq)$_2$
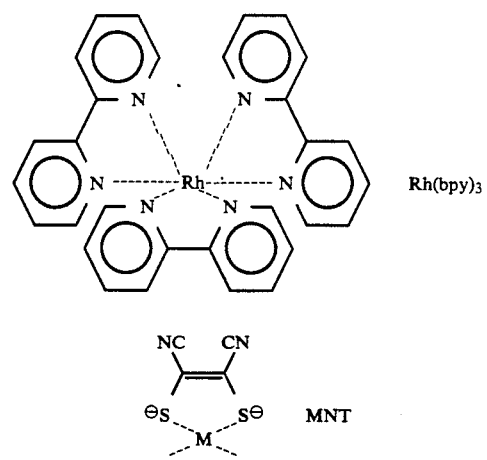 Rh(bpy)$_3$
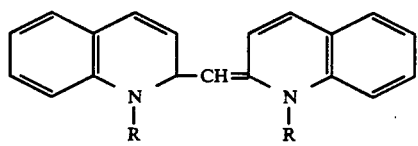 MNT
(5) Cyanin coloring matter donor having the undermentioned structural formulas:
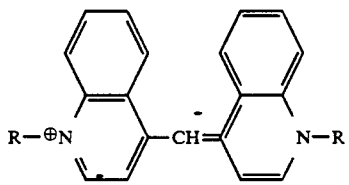
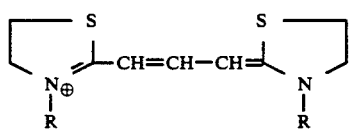
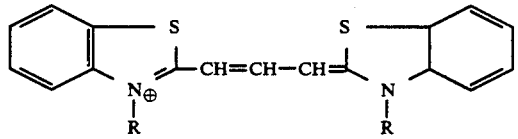
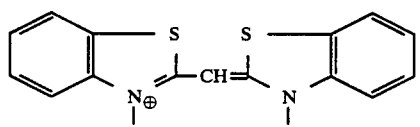
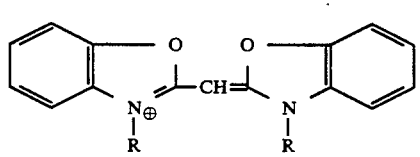
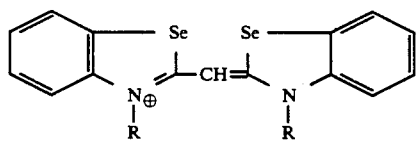
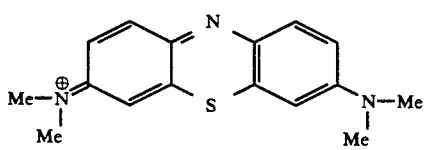
(6) N-containing heterocyclic donor having the undermentioned structural formulas:
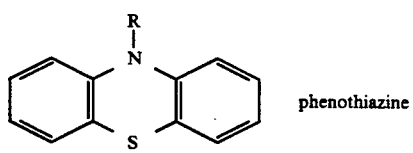 phenothiazine
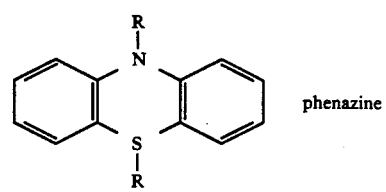 phenazine

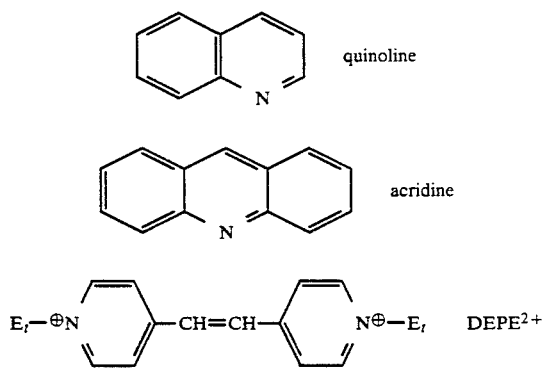

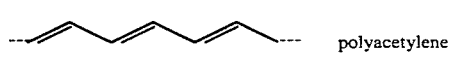

(7) Polymer type donor having the undermentioned structural formulas:

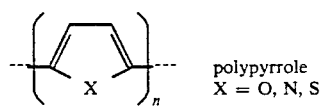

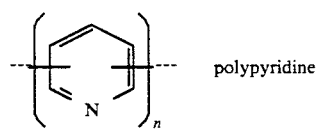

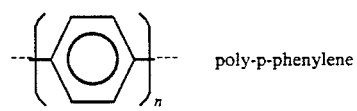

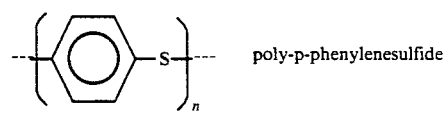

The present invention allows for the application of the derivatives of the donor molecules indicated in items (1) to (7), which have a hydrophobic group with a structural formula $CH_3(CH_2)_n$, $CH_3(CH_2)_p(CH_2=CH_2)_q(CH_2)_r$ (where n and p+q+1 respectively represent larger numbers than 8), or a hydrophilic group with a structural formula of —COOH, —OH, $SO_3H$, —COOR', —$NH_2$, —$N^{\oplus}(R')_3Y^{\ominus}$ (Y denotes halogens), or have both said hydrophobic and hydrophilic groups.

Among the aforementioned donor molecules, amine type donors are preferable, and fulvalene type donors and S-containing heterocyclic compound type dontors are more preferable.

Examples of acceptor molecules suitable for the present invention will be shown:

(1) Cyano compound type acceptors having the undermentioned structural formulas:

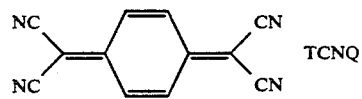

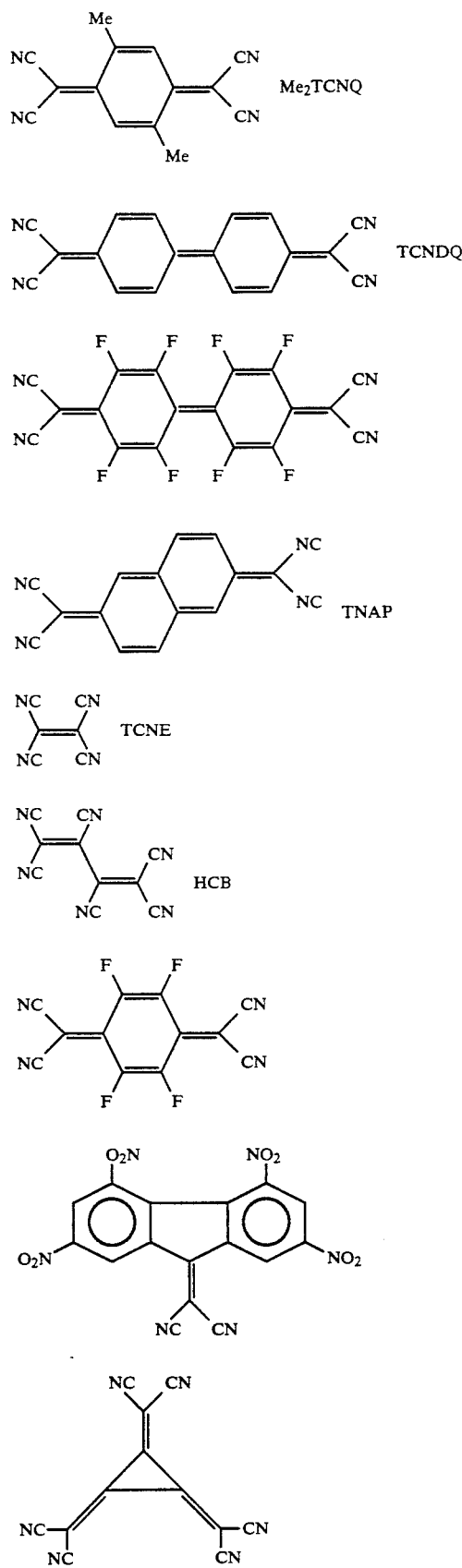

-continued

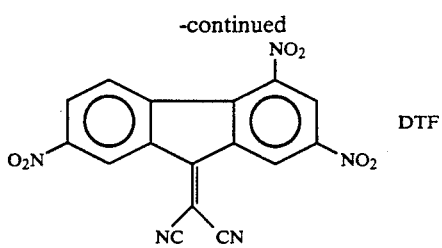
DTF

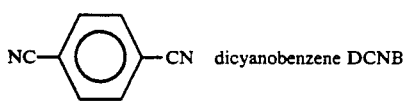
dicyanobenzene DCNB (2) Quione type acceptor having the undermentioned structural formulas:

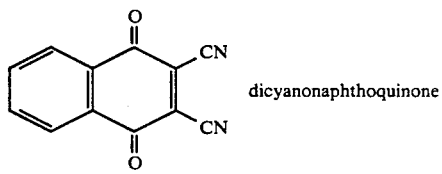
dicyanonaphthoquinone

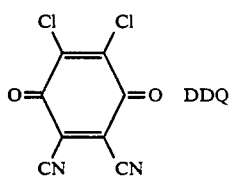
DDQ

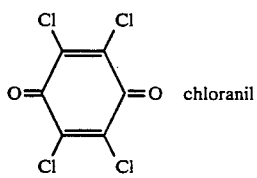
chloranil

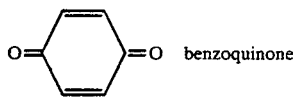
benzoquinone

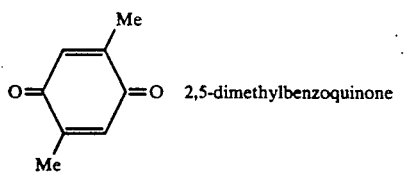
2,5-dimethylbenzoquinone

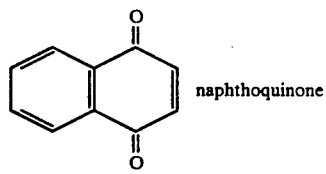
naphthoquinone

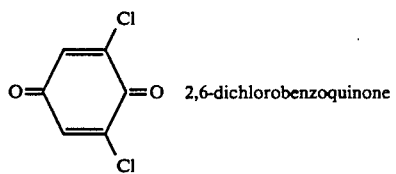
2,6-dichlorobenzoquinone

-continued

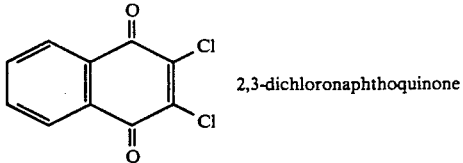
2,3-dichloronaphthoquinone (3) Nitro-compound type acceptor having the undermentioned formulas:

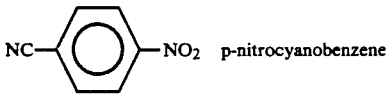
p-nitrocyanobenzene

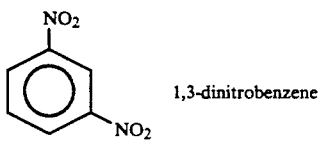
1,3-dinitrobenzene

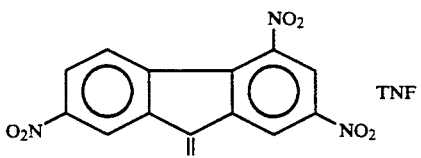
TNF

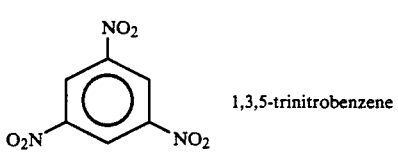
1,3,5-trinitrobenzene

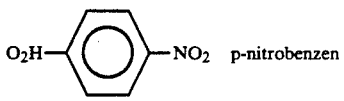
p-nitrobenzen

The present invention allows for the application of the derivatives of the acceptor molecules having the structural formulas indicated in items (1) to (3), which have a hydrophobic group represented by $CH_3(CH_2)_n$, $CH_3(CH_2)_p(CH=CH_2)_q(CH_2)_r$ (where n and a total of p+q+l respectively denote a larger number than 8), or a hydrophilic group represented by —COOH, —OH, —SO₃H, —COOR', —NH₂, —N⊕(R')₃Y⊖ (Y denotes a halogen), or have both such hydrophobic and hydrophilic groups.

Among the above-listed acceptor molecules quinone type acceptors are preferable, and cyano compound type acceptors are more preferable.

In the present invention, as an organic thin film, a so-called mixed stacked organic charge-transfer compound in which the donor molecules and acceptor molecules are alternately stacked is employed. In particular, it is desirable to use a mixed stacked organic charge-transfer compound wherein a peak wavelength $\lambda_{CT}$ of a charge-transfer absorption band is 0.8 μm or above. The charge-transfer absorption band is a basic value representative of properties of a charge-transfer complex. When an absorption spectrum of a thin film (or a crystal) of a charge-transfer complex is measured, the charge-transfer absorption band appears on the longest wavelength side. Thus, the charge-transfer adsorption band can easily be determined. The charge-transfer absorption band has relation to a local neutral-ionic transition, that is, a phenomenon in which charge is transferred from a donor to an acceptor by means of light excitation when light is radiated onto a neutral charge-transfer complex. In accordance with the decrease in energy needed for causing the charge-transfer phenomenon, the charge-transfer absorption band shifts to the longer wavelength side. In other words, the use of the charge-transfer complex, wherein a peak wavelength $\lambda_{CT}$ of a charge-transfer absorption band is 0.8 μm or above, means the use of the charge-transfer complex wherein neutral-ionic transition easily occurs. As has been stated above, a neutral charge-transfer complex (e.g. TTF-CA), in which neutral-ionic transition occurs owing to the change in temperature or pressure, is limited to a complex wherein the peak wavelength $\lambda_{CT}$ of a charge-transfer absorption band is 0.8 μm or more (J. B. Torrance et al.; Phys. Rev. Lett., 46,253 (1981)).

In the display element of the present invention, only one organic thin film may be provided between a pair of electrodes, or a so-called super-lattice structure may be employed.

In the present invention, an insulating layer, which is interposed between at least one electrode and a thin film of a charge-transfer complex, is formed of an insulating material having a relative dielectric constant of 10 or above. Among insulating materials with a relative dielectric constant of 10 or above, those having a high dielectric breakdown electric field strength (specifically, 0.5 MV/cm or above) are desirable. These insulating materials are various ferroelectrics and paraelectrics such as: SrTiO$_3$ (relative dielectric constant $\epsilon_I=140$; dielectric breakdown strength $E^{BD}$ (V/cm)=2×10$^6$), Y$_2$O$_3$ ($\epsilon_I=11$-12, $E^{BD}=2$-5×10$^6$), Ta$_2$O$_5$ ($\epsilon I=22$-25, $E^{BD}=2$-5×10$^6$), Sm$_2$O$_3$ ($\epsilon_I=15$-16, $E^{BD}=2$-4×10$^6$), BaTiO$_3$ ($\epsilon_I=14$-55, $E^{BD}=2$-3×10$^6$), BaTa$_2$O$_6$($\epsilon_I=22$, $E^{BD}=3.5\times10^6$), PbTiO$_3$, Al$_2$O$_3$, PbNb$_2$O$_6$, ZrO$_2$, TiO$_2$, Bi$_2$O$_3$, and ZnS. The insulating layer made of this kind of material is formed by means of a vacuum deposition process, a sputtering process, a CVD process, an anodic oxidation process, or a coating process.

The principle of the present invention will now be described in detail.

In the present invention, as mentioned above, an insulating layer is interposed between at least one electrode and a thin film of a charge-transfer complex in order to increase an electric field strength applied to the charge-transfer complex. Published Unexamined Japanese Patent Application No. 63-161433 discloses a display element having this type of structure. In this prior art document, however, SiO$_2$ or an organic high polymer is used as a material of the insulating layer, and an insulating material having a high relative dielectric constant, as used in the present invention, is not mentioned. In the prior art document, the insulating layer is provided in order to prevent a short-circuit from occurring between electrodes owing to a pin-hole present in an organic thin film, or in order to suppress a reaction between the electrode and the charge-transfer complex.

In an element having a structure wherein the insulating layer is interposed between the thin film of the charge-transfer complex and the electrode, the electric field strength $E_{CT}$ in the thin film of the charge-transfer complex is given by the equation:

$$E_{CT} = \frac{\epsilon_I}{\epsilon_{CT}} E_I \quad (1)$$

where $\epsilon_{CT}$ is a relative dielectric constant of the charge-transfer complex in the direction of stacking, $E_I$ is a relative dielectric constant of the insulating layer, and $E_I$ is an electric field strength in the insulating layer.

In this element, the charge transfer is caused by the application of an electric field in that column of stacked donor-acceptor (hereinafter, referred to as "D-A") within the thin film of the charge-transfer complex, which extends in parallel to the electric field or in a direction perpendicular to the faces of the electrodes. However, the relative dielectric constant is very high in the direction of the column of stacked D-A. As is obvious from equation (1), when the insulating layer is made of a material having a low relative dielectric constant the electric field strength in the direction of the column is very weak. For example, when the charge-transfer complex is formed of TTF-CA and the insulating layer is formed of SiO$_2$, the relative dielectric constant in the direction of the column of stacked TTF-CA is about 300 and the relative dielectric constant of SiO$_2$ is 3.9. Thus, even if an electric field on the order of 10$^6$ V/cm, which is close to a breakdown strength, is attained in the SiO$_2$ layer, only an electric field on the order of 10$^4$ V/cm, is caused in the charge-transfer complex thin film. Thus, even if the insulating layer, having a low relative dielectric constant, is interposed between the electrode and the organic thin film of the charge-transfer complex, the relative dielectric constant of the charge-transfer complex is high and a high electric field is not effectively applied to the charge-transfer complex. Under the situation, the organic thin film element has not been practically used as a display element.

By contrast, in the present invention, an insulating layer having a high relative dielectric constant is employed. As is seen from equation (1), a high electric field applied to the organic thin film increases remarkably, and macroscopic neutral-ionic transition is caused. Thus, a practical display element is obtained.

An organic thin film display element according to the present invention, wherein an insulating layer is made, for example, of SrTiO$_3$, will now be described. As mentioned above, at room temperature, the relative dielectric constant of SrTiO$_3$ is 140 and the dielectric breakdown strength is 2×10$^6$ V/cm. When a TTF-CA mixed stacked organic charge-transfer compound is used as an organic thin film, the relative dielectric constant in the direction of stacked D-A is about 300. Thus, it is understandable that, with the application of an electric field as strong as a dielectric breakdown strength, an electric field of about 1×10$^6$ V/cm is attained in the charge-transfer complex. Supposing that the relative dielectric constant of TTF-CA does not change up to this electric field strength, the degree of polarization P at 1×10$^6$ V/cm is given by:

$$\begin{aligned} P &= 300 \times 8.8 \times 10^{-14} \, (F/cm) \times 1 \times 10^6 \, (V/cm) \\ &= 2.6 \times 10^{-5} \, (C/cm^2) \end{aligned} \quad (2)$$

This degree of polarization is nearly equal to the saturation polarization of a ferroelectric. When such polarization has occurred, since the volume of one D-A pair is about $1.85 \times 10^{-22}$ cm$^3$, the magnitude of the dipole moment p attained by the D-A pair is given by:

$$P = 4.8 \times 10^{-27} \text{ (C.cm)}$$

The magnitude of the dipole moment p, given above, corresponds to that of the dipole moment when the charge of one electron shifts by 3.0 Å. On the other hand, a distance between D and A is about 3.4 Å, therefore the magnitude of dipole moment p is corresponds to the change of the molecular from the neutral state to the ionic state.

The above-mentioned SrTiO$_3$ has a very high relative dielectric constant, i.e. 140, and is an ideal material of the insulating layer. In reality, however, even if the material of the insulating layer has a relative dielectric constant lower than that of SrTiO$_3$, the above-described advantages are surely attained. The reason why the relative dielectric constant of the insulating layer is set to 10 or more in the present invention will now be described.

The magnitude of dipole moment, if corresponding to the shift (about 0.3 Å) of about 10% of the D-A distance, can fully change physical properties of the organic thin film. In this case, it should suffice if the dipole moment p and polarization P are:

$$P = 4.8 \times 10^{-28} \text{ (C cm)} \qquad (3)$$

$$P = 2.6 \times 10^{-6} \text{ (C/cm}^2\text{)} \qquad (4)$$

An electric field strength required for realizing the polarization given by equation (4) is found as follows:
On the basis of the following equation (5), $$\begin{aligned} P &= \epsilon_{CT} \cdot \epsilon_0 \cdot E_{CT} \\ &= \epsilon_I \cdot \epsilon_0 \cdot E_I \end{aligned} \qquad (5)$$

the electric field strength $E_I$ in the insulating layer is given by:

$$\begin{aligned} E_I &= \frac{2.6 \times 10^{-6} \text{ (C/cm}^2\text{)}}{8.8 \times 10^{-14} \text{ (C/V·cm)} \times \epsilon_I} \\ &= \frac{3.0 \times 10^7}{\epsilon_I} \end{aligned} \qquad (6)$$

If the electric field given by equation (6) is lower than the dielectric breakdown strength of the insulating material, the display element can be practically used. The dielectric breakdown strength of various insulating materials exhibit the aforementioned value, and most of the insulating materials are not destroyed up to about $3 \times 10^6$ V/cm.

Therefore, the following formula is established:

$$\frac{3.0 \times 10^7}{\epsilon_I} \leq 3 \times 10^6$$

$$\therefore \epsilon_I \geq 10$$

In other words, the organic thin film element having the structure of the present invention is practically used as a display element, if the relative dielectric constant of the insulating material is 10 or more.

Further, in a structure in which two different insulating films are laminated, it is well known that an electric field exceeding the dielectric breakdown strength of one of the insulating films can be applied. Even if dielectric breakdown occurs in part of one insulating film, the dielectric breakdown does not progress by virtue of the presence of the other insulating film. Defects due to partial destruction is self-repaired. This phenomenon is applied to the organic thin film element of the present invention. This phenomenon can occur when the product of the relative dielectric constant and the dielectric breakdown strength (the product is referred to as "maximum accumulated amount of charge") of the insulating layer is set greater than that of the organic thin film. If such an insulating layer is used, breakdown destruction does not progress even if the electric field strength $E_{CT}$ in the organic thin film exceeds the dielectric breakdown strength $E_{CT}^{BD}$ and the element is not destroyed. In other words, an electric field can be applied to the element until the insulating film is destroyed. Under the situation, the electric field strength applied to the organic thin film is given by:

$$E_{CT}' = \frac{\epsilon_I}{\epsilon_{CT}} E_I^{BD} \qquad (1')$$

The electric field to be applied to the organic thin film can be increased from the dielectric breakdown strength $E_{CT}^{BD}$ of the organic thin film up to the value obtained by equation (1').

Examples of the organic thin film display element according to the present invention will now be described with reference to FIGS. 1 to 3.

In an organic thin film display element shown in FIG. 1, a first electrode layer 12 formed of a transparent electrode such as indium tin oxide (ITO), a first insulating layer 13, an organic thin film 14 formed of a mixed stacked organic charge-transfer compound (CT), a second insulating layer 15, and a second electrode layer 16 are laminated in this order on a substrate 11 formed of, e.g. silica glass.

The organic thin film display element shown in FIG. 1 has two insulating layers: the first insulating layer 13 between the first electrode layer 12 and the organic thin film 14, and the second insulating layer 15 between the organic thin film 14 and the second electrode layer 16. It should suffice if one of the two insulating layers has a relative dielectric constant of 10 or more.

The display element shown in FIG. 1 has a single organic thin film; however, as mentioned above, an organic thin film of a super-lattice structure may be employed. FIGS. 2 and 3 show organic thin film display elements having organic thin films of the super-lattice structure.

Figure 2:
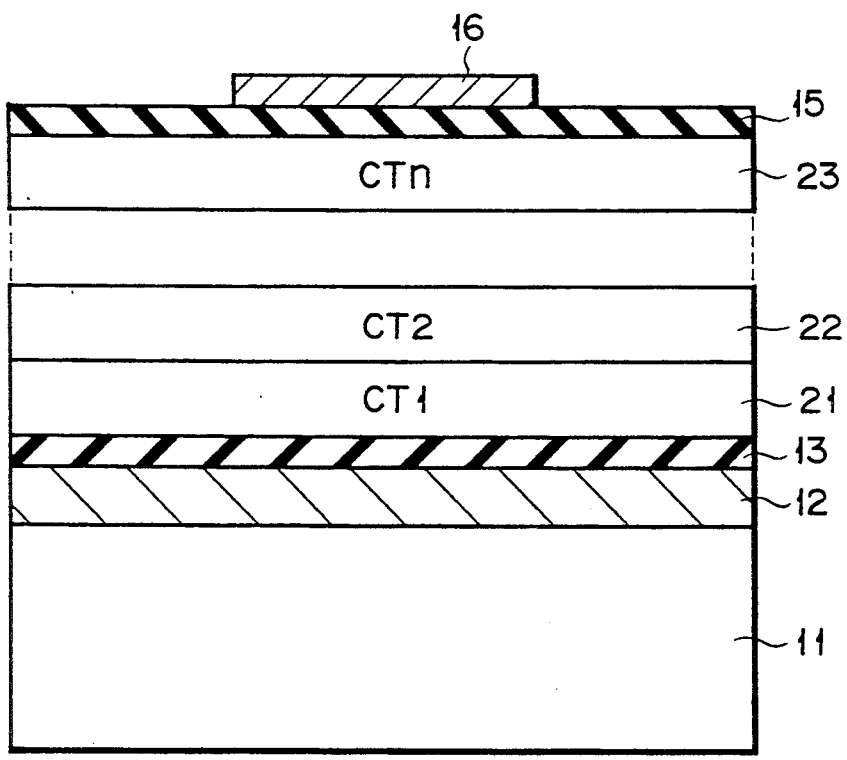
FIG. 2 is a cross-sectional view showing an example of an organic thin film display element of a super-lattice structure according to the invention.

The display element shown in FIG. 2 has a super-lattice structure wherein an organic thin film 21 formed of a charge-transfer complex CT$_1$, an organic thin film 22 formed of a charge-transfer complex CT$_2$,..., and an organic thin film 23 formed of a charge-transfer complex CT$_n$ are sequentially laminated.

Figure 3:
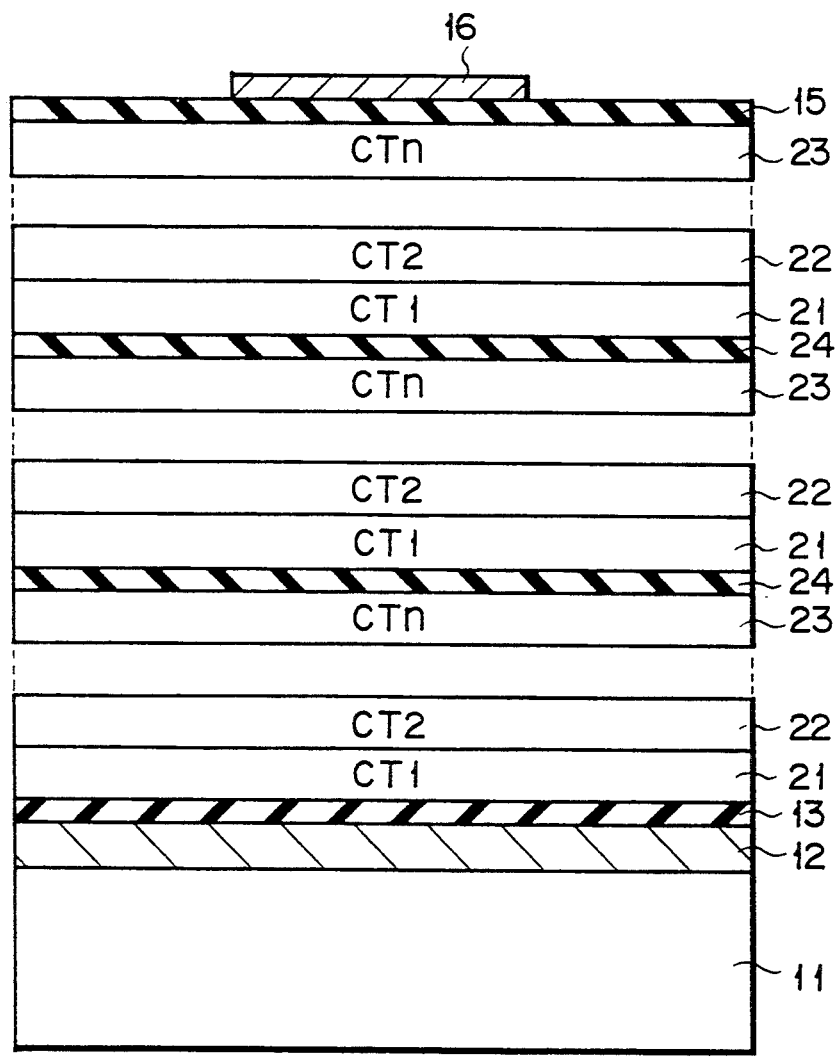
FIG. 3 is a cross-sectional view showing another example of an organic thin film display element of a super-lattice structure according to the invention

The display element shown in FIG. 3 has a multiple super-lattice structure, in which a number of super-lattice structures each comprising organic thin film 21 formed of charge-transfer complex CT$_1$, organic thin film 22 formed of charge-transfer complex CT$_2$,..., and organic thin film 23 formed of charge-transfer complex CT$_n$, are stacked with insulating layers 24 being interposed between two adjacent super-lattice structures.

The organic thin film display elements as shown in FIGS. 1 to 3 are formed by sequentially laminating each layer on the substrate 11. In this process, the insulating layer formed on the organic thin film may adversely affect the organic thin film, as will be explained below. Thus, attention needs to be paid to the insulating material of the insulating layer formed on the organic thin film, as well as to the process of forming the insulating layer.

Generally known processes of forming the insulating thin film include a vacuum deposition process, a sputtering process, etc. When an inorganic compound is used and an insulating layer is formed on an organic thin film by means of a vacuum deposition process or a sputtering process by using a conventional apparatus, serious thermal damage is caused to the organic thin film in the process of forming the insulating layer. As a result, the mixed stacked organic charge-transfer compound in the organic thin film may be decomposed or peeled off from the substrate; thus, an effective element structure cannot be attained. It is possible to use an organic low molecular weight compound and form an insulating layer on an organic thin layer by means of a vacuum deposition process; however, mechanical and thermal properties of an insulating layer made of an organic low molecular weight compound are generally not good. Thus, when a second electrode layer is formed on this insulating layer by means of a vacuum deposition process, the insulating layer may be damaged and the function of the insulating layer may be deteriorated. The inventors of the present invention formed various films made of organic low molecular weight compounds on various organic thin films, and formed various metal electrodes on the insulating layers by means of vacuum deposition. They examined the insulation properties of the insulating films, and found that current leakage occurred owing to a disordered film structure or needle-shaped metal inserted into the film.

An LB technique is also known as a method of forming an insulating layer on an organic thin film; however, in forming the insulating layer by means of the LB technique, the organic thin film needs to be immersed in water and the stability of a mixed stacked organic charge-transfer compound in the organic thin film may be lost. Also, because of the immersion in water, it is inevitable that impurities enter the organic thin film and the laminated insulating film, and operational characteristics of the element may be degraded. Further, organic molecules used in the LB technique must be amphipathic or must have both hydrophilic and hydrophobic groups. Such organic molecules are difficult to synthesize. In fact, organic molecules to which the LB technique is applicable are limited. In addition, according to recent studies, an accumulated film obtained by the LB technique is not perfect and is considerably defective. The defects of the film adversely affects the insulating properties and the stability in structure of the insulating layer. In order to reduce the defects of the film while using the LB technique, it is necessary to use a special apparatus and to produce the film at a very low rate. These disadvantages are serious in practical aspects.

Considering the above, it is desirable to form the insulating layer on the organic thin film by using the organic high molecular compound and by means of the vacuum deposition process.

It is desirable that an organic high molecular film serving as an insulating layer on an organic thin film have a high relative dielectric constant. For example, such an organic polymer is a polyethylene derivative including at least one of a halogen, a cyano group, a hydroxyl group, an amino group, a carboxyl group, a nitro group, an ester group, and an ether group on a side chain; or a condensation polymer consisting of at least one of a polyamide, a polyimide, a polyurethane, a polyester, a polycarbonate, a polyether, and a polythioether. Specifically, the following ferroelectric and paraelectric polymers may be listed: vinylidene type polymers such as polyvinylidene fluoride (PVDF, relative dielectric constant $\epsilon_I = 10$), vinylidene fluoride/ trifluoride ethylene copolymer (PVDF/TrFE, $\epsilon_I = 10$), vinylidene fluoride/tetrafluoride etheylene copolymer (PVDF/TFE, $\epsilon_I = 10$), and vinylidene cyanide/vinyl acetate copolymer (PVDCN/VAc, $\epsilon_I = 6$); cyanoethylated type polymers ($\epsilon_I = 10-20$) such as cyanoethylcellulose, cyanoethylstarch, poly (cyanoethyl methacrylate), and poly (cyanoethylacrylate); polyvinyl alcohol ($\epsilon_I = 10$); polyethylene oxide ($\epsilon_I = 15$); and 5,7-nylon ($\epsilon_I = 7.7$). Among these organic polymers, those with high heat resistance, which are free from thermal decomposition at relatively high temperature, are particularly preferable. Also, the polymers having a relative dielectric constant of 10 or above may be substituted for the aforementioned inorganic compounds.

When the insulating layer is formed of the aforementioned organic polymers, a desirable polymer itself may be subjected to vacuum deposition. Alternatively, two or more monomers or oligamers may be subjected to vacuum deposition, following which a polymerization reaction is caused to occur.

As has been described above, the insulating material of the insulating layer formed on the organic thin film and the method of forming the insulating layer are suitably selected, whereby the insulating layer having excellent heat resistance and mechanical properties can easily been obtained without causing damage to the organic thin film. Also, if the condition of the vacuum deposition is controlled, the crystal type and molecular arrangement of the insulating layer are controlled and the contamination of impurities is prevented. Thus, the insulating layer with excellent insulating properties can be obtained.

If it is considered that the organic thin film display element of the present invention is put into practice, it is desirable that the electrodes have a matrix structure. The matrix structure of the electrodes may be a simple matrix structure or an active matrix structure.

Figure 4:
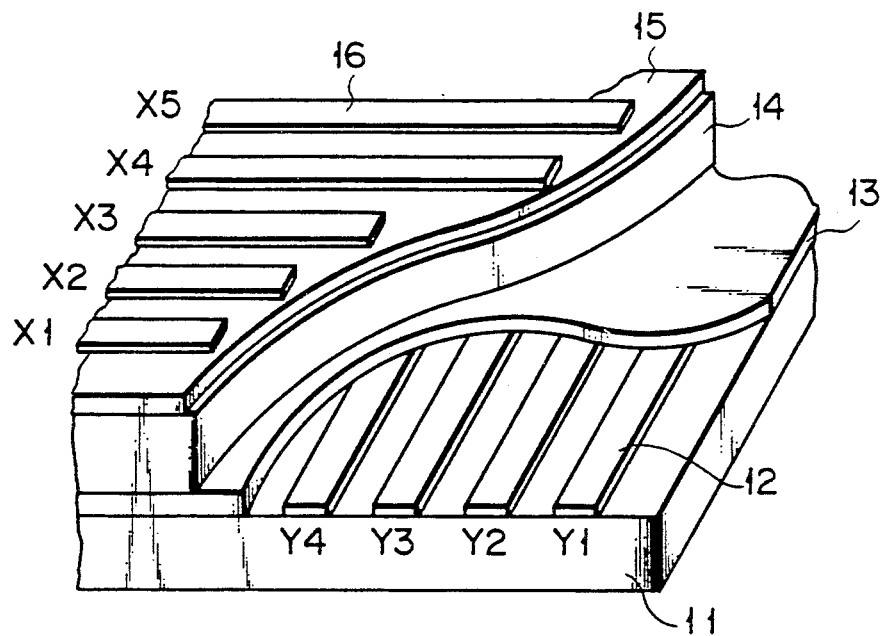
FIG. 4 is a perspective view of an organic thin film display element having simple matrix type electrodes according to the present invention.

FIG. 4 shows the simple matrix structure, wherein striped first electrode layer 12 intersect striped second electrode layer 16 at right angles.

In the active matrix structure, non-linear elements are formed on individual pixels on a substrate. The non-linear element may be a three-terminal type element such as a thin-film transistor (TFT), or a two-terminal type element such as an metal-insulator-metal (MIM) diode.

EXAMPLE 1

The organic thin film display element shown in FIG. 1 was manufactured in the following manner.

A first transparent electrode layer 12 formed of ITO and having a thickness of 4000 Å was formed on a silica glass substrate 11 by means of sputtering. The substrate 11 on which the first electrode layer 12 was formed was kept at a temperature of 500° C., and, a first insulating layer 13 formed of $SrTiO_3$ and having a thickness of 2000 Å was formed on the first electrode layer 12 by means of sputtering. An organic thin film 14 formed of TTF-CA and having a thickness of 5000 Å, which constitutes a mixed stacked organic charge-transfer compound, was formed on the first insulating layer 13 by means of a sublimation method. Then, 20 monomolecular films of cyanoethylcellulose ($\epsilon_I = 15$) were accumulated on the organic thin film 14 by means of the Langmuir-Blodgett's (LB) technique, thereby forming a second insulating layer 15 having a thickness of 300 Å. A semitransparent second electrode layer 16 formed of Au and having a thickness of 200 Å was formed on the second insulating layer 15 by means of a vacuum deposition method.

The material of the first insulating layer 13, or $SrTiO_3$, has the relative dielectric constant $\epsilon_I = 140$ and the dielectric breakdown strength $E_I^{BD} = 2 \times 10^6$ V/cm. The vacuum dielectric constant $\epsilon_o = 8.8 \times 10^{-14}$ C/V·cm, therefore the maximum accumulated amount of charge is represented by:

$$\epsilon_I \cdot \epsilon_o \cdot E_I^{BD} = 24.6 \ (\mu C/cm^2)$$

On the other hand, TTF-CA has the relative dielectric constant $\epsilon_{CT}$=about 300 and the dielectric breakdown strength $E_{CT}^{BD}$=about $1 \times 10^4$ V/cm (Y. Tokura et al., Mol. Cryst. Liq. Cryst., 125, 71 (1985)). Thus, the maximum accumulated amount of charge is represented by:

$$\epsilon_{CT} \cdot \epsilon_o \cdot E_{CT}^{BD} = 0.264 \ (\mu C/cm^2)$$

Figure 5:
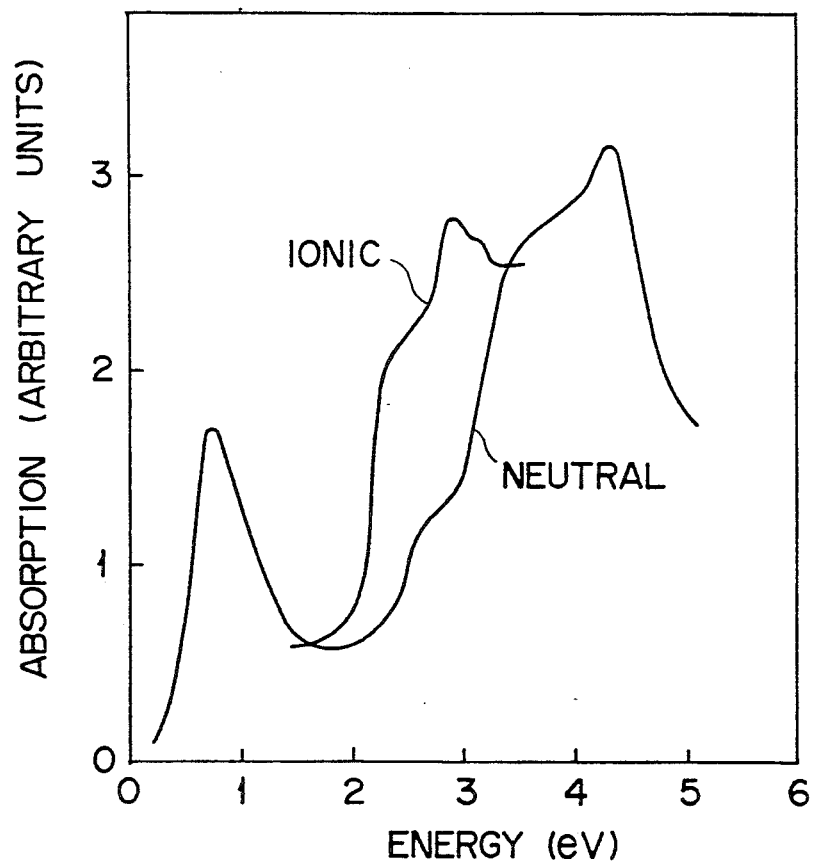
FIG. 5 is a graph showing an absorption spectrum of a neutral and ionic TTF-CA charge-transfer complex.

Regarding this element, when no voltage was applied between the two electrodes, the organic thin film 14 was yellow. The voltage was applied between the two electrodes, and when the voltage was raised to about 45 V, the color of the organic thin film 14 clearly changed to red. FIG. 5 shows an absorption spectrum obtained in this case. As seen from FIG. 5, it was confirmed that a high electric field was effectively applied to the organic thin film 14 formed of TTF-chloranil and the neutral-ionic transition occurred.

EXAMPLE 2

In the same manner as in Example 1, an organic thin film display element having simple-matrix type electrodes shown in FIG. 4 was manufactured. On a silica glass substrate 11, there were sequentially provided a striped first electrode layer 12 formed of ITO and having a thickness of 4000 Å, a first insulating layer 13 formed of $SrTiO_3$ and having a thickness of 2000 Å, an organic thin film formed of TTF-CA and having a thickness of 5000 Å, a second insulating layer 15 formed of cyanoethylcellulose accumulated films and having a thickness of 300 Å, and a striped second electrode layer 16 formed of Al and having a thickness of 200 Å, extending in a direction perpendicular to the first electrode layer 12.

In this organic thin film display element, one picture element is formed at each intersection of the first electrode layer 12 and the second electrode layer 16. The first electrode layer 12 ($Y_1, Y_2, \ldots, Y_m$) serves as a signal electrode, and the second electrode layer 16 ($X_1, X_2, \ldots, X_n$) serves as a scanning electrode. According to the timing chart of FIG. 6, the scanning electrode is driven in a time-division manner whereby a predetermined picture element is selected and an image is formed.

Figure 6:
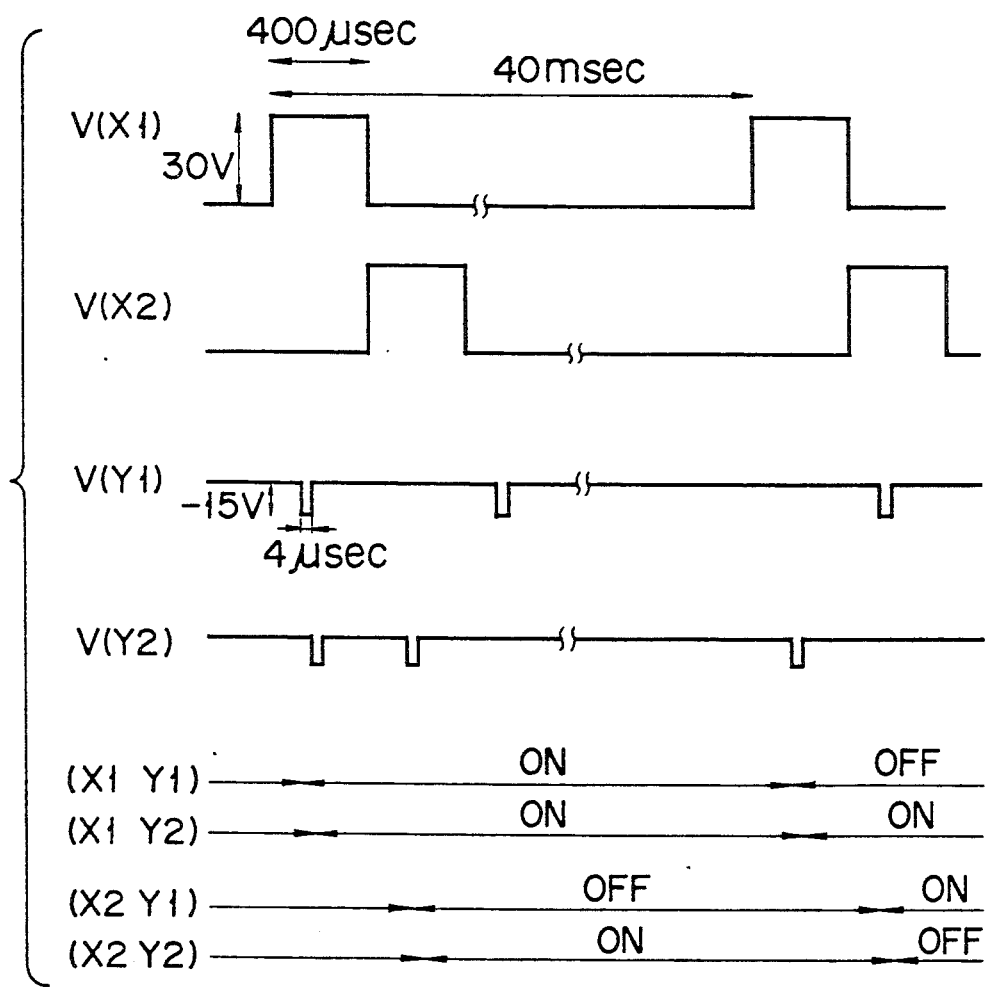
FIG. 6 is a timing chart of a driving voltage applied to an organic thin film display element in Example 2.

FIG. 6 represents the driving signal timing chart of a matrix display. The scanning electrodes $X_1, X_2, \ldots, X_n$ are successively impressed with a pulse voltage of 30 V having a width of 400 microseconds. Since 100 scanning electrodes are provided, pulse voltage is impressed with a period of 40 milliseconds. Signal electrodes $Y_1, Y_2, \ldots, Y_m$ are impressed with a signal pulse voltage having a width of 4 microseconds with a period of 400 microseconds. When the signal pulse voltage stands at $-15$ V, the corresponding picture element is rendered conducting for display. When the signal pulse voltage indicates 0 V, the corresponding picture element is rendered off. FIG. 6 indicates the on and off states of the respective picture elements.

With this display element, non-selected picture elements took on yellow color and selected picture elements took on red color, whereby a simple image was formed.

EXAMPLE 3

With use of the materials of the organic thin film shown in Table 1, the organic thin film display element shown in FIG. 1 was manufactured in the same manner as in Example 1. The absorption spectra of each organic thin film was measured and the peak wavelength $\lambda_{CT}$ of the charge-transfer absorption band was examined. Also, it was examined whether the color of each organic thin film changed when a voltage applied thereto was gradually increased. The result was shown in Table 1.

As is clear from Table 1, when the organic thin film having the peak wavelength $\lambda_{CT}$ of the charge-transfer absorption band in a range not less than 0.8 μm was used, the color of the organic thin layer sharply changed in accordance with the neutral-ionic transition.

TABLE 1

| Organic Thin Film | $\lambda_{CT}$ (μm) | Color Change |
|---|---|---|
| PTZ-TCNQ | 1.50 | Present |
| TMDAP-TCNQ | 1.35 | " |
| TTF-chloranil | 1.70 | " |
| TTF-fluoranil | 1.65 | " |
| Dibenzene TTF-TCNQ | 1.35 | " |
| DEDMTSeF-diethyl TCNQ | 1.57 | " |
| TMDAP-fluoranil | 1.08 | " |
| TTF-dichlorobenzoquinone | 1.24 | " |
| Perylene-tetrafluoro TCNQ | 1.27 | " |
| Perylene-DDQ | 1.15 | " |
| Perylene-TCNE | 0.90 | " |
| Perylene-TCNQ | 0.93 | " |
| TTF-dinitrobenzene | 0.81 | " |
| Perylene-chloranil | 0.81 | " |
| Pyrene-TCNE | 0.79 | Absent |
| Pyrene-chloranil | 0.62 | " |
| Anthracene-chloranil | 0.65 | " |
| Hexamethylbenzene-chloranil | 0.61 | " |
| Naphthalene-TCNE | 0.57 | " |
| Anthracene-PMDA | 0.50 | " |
| Anthracene-tetracyanobenzene | 0.51 | " |
| Phenanthrene-PMDA | 0.42 | " |

PTZ: phenothiazine
TCNQ: tetracyanoquinodimethane
TMDAP: tetramethyldiaminopyrene
TTF: tetrathiafulvalene
DEDMTSeF: diethyldimethyltetraselenafulvalene
DDQ: dichlorodicyanobenzoquinone
TCNE: tetracyanoethylene
PMDA: pyromellitic dianhydride

EXAMPLE 4

The second insulating layer 15, or the cyanoethylcellulose accumulated films in Example 1, was replaced with a polyvinylidene fluoride film (PVDF, $\epsilon_I = 10$) formed by means of vacuum deposition and having a thickness of 1000 Å, and the organic thin film display element shown in FIG. 1 was manufactured.

The second insulating layer 15 of PVDF was formed in the following manner. A first electrode layer 12, a first insulating layer 13 and an organic thin film 14 were successively formed on a glass substrate 11 by the same process as in Example 1. The resultant substrate was attached to a substrate holder in a vacuum vessel. Then, 6.0 mg of PVDF powder was put in a boat-shaped evaporation cell. The substrate was cooled to the temperature of liquid nitrogen. The evaporation cell was gradually heated up to 450° C. under a pressure of $5 \times 10^{-6}$ Torr, thereby performing vacuum deposition. The amount of deposition was monitored by a film thickness monitor and controlled by a shutter arranged at an upper part of the evaporation cell. Separately, a PVDF thin film of a thickness of 1000 Å was formed on a Si substrate by vacuum deposition under the same conditions. The IR spectrum of this PVDF thin film was measured and found to be the same as the IR spectrum of the PVDF powder. Thereafter, a second electrode layer 16 was formed by the same process as in Example 1, thus the organic thin film display element was manufactured.

Regarding this display element, the organic thin film 14 was yellow when no voltage was applied between the two electrodes. When the voltage was applied between the two electrodes and raised up to about 115 V, the color of the organic thin film 14 clearly changed to red.

EXAMPLE 5

The second insulating layer 15, or the cyanoethylcellulose accumulated films in Example 1, was replaced with a poly (cyanoethylacrylate) film ($\epsilon_I = 10$) formed by means of vacuum deposition and having a thickness of 1000 Å, and the organic thin film display element shown in FIG. 1 was manufactured.

The second insulating layer 15 of poly (cyanoethylacrylate) was formed in the following manner. A transparent first electrode layer 12, a first insulating layer 13 and an organic thin film 14 were successively formed on a glass substrate 11 by the same process as in Example 1. The resultant substrate was attached to a substrate holder in a vacuum vessel. Then, 5 mg of poly (cyanoethylacrylate) powder was put in a boat-shaped evaporation cell. The substrate was cooled to the temperature of liquid nitrogen. The evaporation cell was gradually heated up to 400° C. under a pressure of $5 \times 10^{-6}$ Torr, thereby performing vacuum deposition. It was found from GPC measurement that cleavage of the main chain of the poly (cyanoethylacrylate) occurred after the deposition; however, it was confirmed from IR spectrum that the cyanoethyl group remained after the deposition. Thereafter, a second electrode layer 16 was formed by the same process as in Example 1, thus the organic thin film display element was manufactured.

Regarding this display element, the organic thin film 14 was yellow when no voltage was applied between the two electrodes. When the voltage was applied between the two electrodes and raised up to about 115 V, the color of the organic thin film 14 clearly changed to red.

EXAMPLE 6

The organic thin film display element having a super-lattice structure shown in FIG. 3 (where n=1) was manufactured in the following manner.

A first transparent electrode layer 12 formed of ITO and having a thickness of 4000 Å and a first insulating layer 13 formed of $SrTiO_3$ and having a thickness of 1000 Å were successively formed on a glass substrate 11 by the same process as in Example 1. Then, 30 couple of layers of an organic thin film 14 formed of TTF-CA and having a thickness of 100 Å and a insulating layer 24 formed of PVDF and having a thickness of 30 Å were repeatedly laminated, thus the super-lattice structure are formed. Thereafter, a second insulating layer formed of PVDF and having a thickness of 100 Å and a semitransparent second electrode layer 16 formed of Au and having a thickness of 200 Å were formed.

Regarding this display element, the organic thin film 14 was yellow when no voltage was applied between the two electrodes. When the voltage was applied between the two electrodes and raised up to about 100 V, the color of the organic thin film 14 clearly changed to red.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An organic thin film display element, comprising:
   a pair of electrodes;
   an organic thin film interposed between said electrodes and including both donor molecules and acceptor molecules; and
   an insulating layer having a relative dielectric constant of 10 or more, and interposed between at least one of said electrodes and said organic thin film.

2. The element according to claim 1, wherein said organic thin film has a super-lattice structure.

3. The element according to claim 1, wherein the product of the relative dielectric constant and the dielectric breakdown strength of said insulating layer is greater than the product of the relative dielectric constant and the dielectric breakdown strength of said organic thin film.

4. The element according to claim 3, wherein said insulating layer is formed of a ferroelectric or paraelectric inorganic compound.

5. The element according to claim 4, wherein said inorganic compound is one selected among the group consisting of $SrTiO_3$, $Y_2O_3$, $Ta_2O_5$, $Sm_2O_3$, $BaTiO_3$, $BaTa_2O_6$, $PbTiO_3$, $Al_2O_3$, $PbNb_2O_6$, $ZrO_2$, $TiO_2$, $Bi_2O_3$, and ZnS.

6. The element according to claim 1, further comprising an insulating layer formed of a ferroelectric or paraelectric organic high molecular compound on said organic thin film.

7. The element according to claim 6, wherein said organic high molecular compound is a polyethylene derivative including at least one of a halogen, a cyano group, a hydroxyl group, an amino group, a carboxyl group, a nitro group, an ester group, and an ether group on a side chain; or a condensation type high molecular compound consisting of at least one of a polyamide, a polyimide, a polyurethane, a polyester, a polycarbonate, a polyether, and a polythioether.

8. The element according to claim 1, wherein an insulating layer formed of a ferroelectric or paraelectric inorganic compound having a relative dielectric constant of 10 or more is arranged between the electrode under the organic thin film and the organic thin film, and an insulating layer formed of a ferroelectric or paraelectric organic high molecular compound is arranged between the organic thin film and the electrode above the organic thin film.

9. The element according to claim 1, wherein said pair of electrodes are arranged such that the pair of electrodes constitute lines perpendicular to each other.

10. The element according to claim 1, wherein one of said pair of electrodes consists of a non-linear element and a pixel electrode.

11. An organic thin film display element, comprising:
a pair of electrodes;
an organic thin film interposed between said electrodes and formed of a mixed stacked organic charge-transfer compound; and
an insulating layer having a relative dielectric constant of 10 or more, and interposed between at least one of said electrode sand said organic thin film.

12. The element according to claim 11, wherein the peak wavelength $\lambda_{CT}$ of a charge-transfer absorption band of the mixed stacked organic charge-transfer compound is 0.8 μm or more.

* * * * *